(12) United States Patent
Lu et al.

(10) Patent No.: US 10,435,287 B2
(45) Date of Patent: Oct. 8, 2019

(54) AUTOMATIC COVER-OPENING AND CONNECTOR-REPLACING DEVICE FOR CHEMICAL CONTAINER

(71) Applicant: MARKETECH INTERNATIONAL CORP., Taipei (TW)

(72) Inventors: Chien-Kuo Lu, Hsinchu (TW);
Chi-Yuan Pung, Hsinchu (TW);
Chi-Ta Yeh, Hsinchu (TW)

(73) Assignee: MARKETECH INTERNATIONAL CORP., Taipei (TW)

( * ) Notice: Subject to any disclaimer, the term of this patent is extended or adjusted under 35 U.S.C. 154(b) by 182 days.

(21) Appl. No.: 15/802,102

(22) Filed: Nov. 2, 2017

(65) Prior Publication Data
US 2019/0127206 A1  May 2, 2019

(51) Int. Cl.
| | |
|---|---|
| *B67D 7/02* | (2010.01) |
| *B67D 7/32* | (2010.01) |
| *B67B 7/44* | (2006.01) |
| *B67D 7/84* | (2010.01) |
| *B67B 7/18* | (2006.01) |
| *B23P 19/04* | (2006.01) |

(52) U.S. Cl.
CPC .............. *B67D 7/02* (2013.01); *B23P 19/046* (2013.01); *B67B 7/182* (2013.01); *B67B 7/44* (2013.01); *B67D 7/0288* (2013.01); *B67D 7/3209* (2013.01); *B67D 7/3272* (2013.01); *B67D 7/84* (2013.01)

(58) Field of Classification Search
CPC ......... B23P 19/046; B23P 19/00; B23P 19/04; B67B 7/00; B67B 7/02; B67B 7/14; B67B 7/182; B67B 7/42; B67B 7/44; B67B 7/16; B67B 7/164; B67D 7/02; B67D 7/0288; B67D 7/62–66; B67D 7/84; Y10T 29/49822; Y10T 29/5152; Y10T 29/5154; Y10T 29/5155
See application file for complete search history.

(56) References Cited

U.S. PATENT DOCUMENTS

| | | | | |
|---|---|---|---|---|
| 5,533,407 A | * | 7/1996 | Besnier | B67B 7/182 |
| | | | | 73/863.81 |
| 2015/0175289 A1 | * | 6/2015 | Zumbach | B65B 69/00 |
| | | | | 53/492 |
| 2016/0251206 A1 | * | 9/2016 | Gold | B65B 57/02 |
| | | | | 53/492 |

FOREIGN PATENT DOCUMENTS

KR         101642640 B1 *  7/2016  ............. B67B 7/182

* cited by examiner

*Primary Examiner* — Matthew P Travers
(74) *Attorney, Agent, or Firm* — Egbert Law Offices, PLLC

(57) ABSTRACT

An automatic cover-opening and connector-replacing device for chemical container is disclosed. The device solves the problems of toxic substance leakage and even industrial safety accidents like gas explosions due to aging equipment during the maintenance by operating personnel in high-risk operation areas. The automatic cover-opening and connector-replacing device for chemical container mainly includes a machine, a lifting device provided inside the machine, a cover-opening device connected with the lifting device and a liquid-pumping device connected with the lifting device. The cover-opening device is provided for assembling and disassembling the internal cover of a chemical container and the liquid-pumping device is provided for pumping the content of the chemical container where the lifting device is provided for adjusting the distance between the cover-opening device, liquid-pumping device and chemical container.

14 Claims, 10 Drawing Sheets

AUTOMATIC COVER-OPENING AND CONNECTOR-REPLACING DEVICE FOR CHEMICAL CONTAINER

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a kind of automatic cover-opening and connector-replacing device, and more particular to the innovative structural configuration disclosed of a kind of automatic cover-opening and connector-replacing device which is applied onto chemical containers.

2. Description of Related Art Including Information Disclosed Under 37 CFR 1.97 and 37 CFR 1.98

Various chemical containers, waste liquid tanks and other highly dangerous operation areas endangering personal safety are often provided in the working environment of high-tech industries and the relevant operating personnel must wear the protection equipment with predetermined protection ability, such as, protective clothing, toxin filter apparatus, masks, protective gloves and safety shoes, before entering the highly dangerous areas for maintenance or operation. Even if the operating personnel have already worn the full protection equipment, the occurrence of an emergency is still hard to avoid, such as toxic substance leakage possibly caused by the improper operation of operating personnel or equipment aging or occurrence of an industrial safety accident like a gas explosion, causing losses to life and property. Therefore, how to prevent and control the aforementioned disasters is an important subject at present.

BRIEF SUMMARY OF THE INVENTION

The present invention utilizes said cover-opening device, liquid-pumping device, lifting device and other innovative and unique structural configurations and technical characteristics to enable the present invention to replace the manual operation with the automatic cover-opening and connector-replacing device for chemical containers to achieve the purpose of preventing industrial safety accidents, thus having special practical advancement.

DETAILED DESCRIPTION OF THE INVENTION

Figure 1:
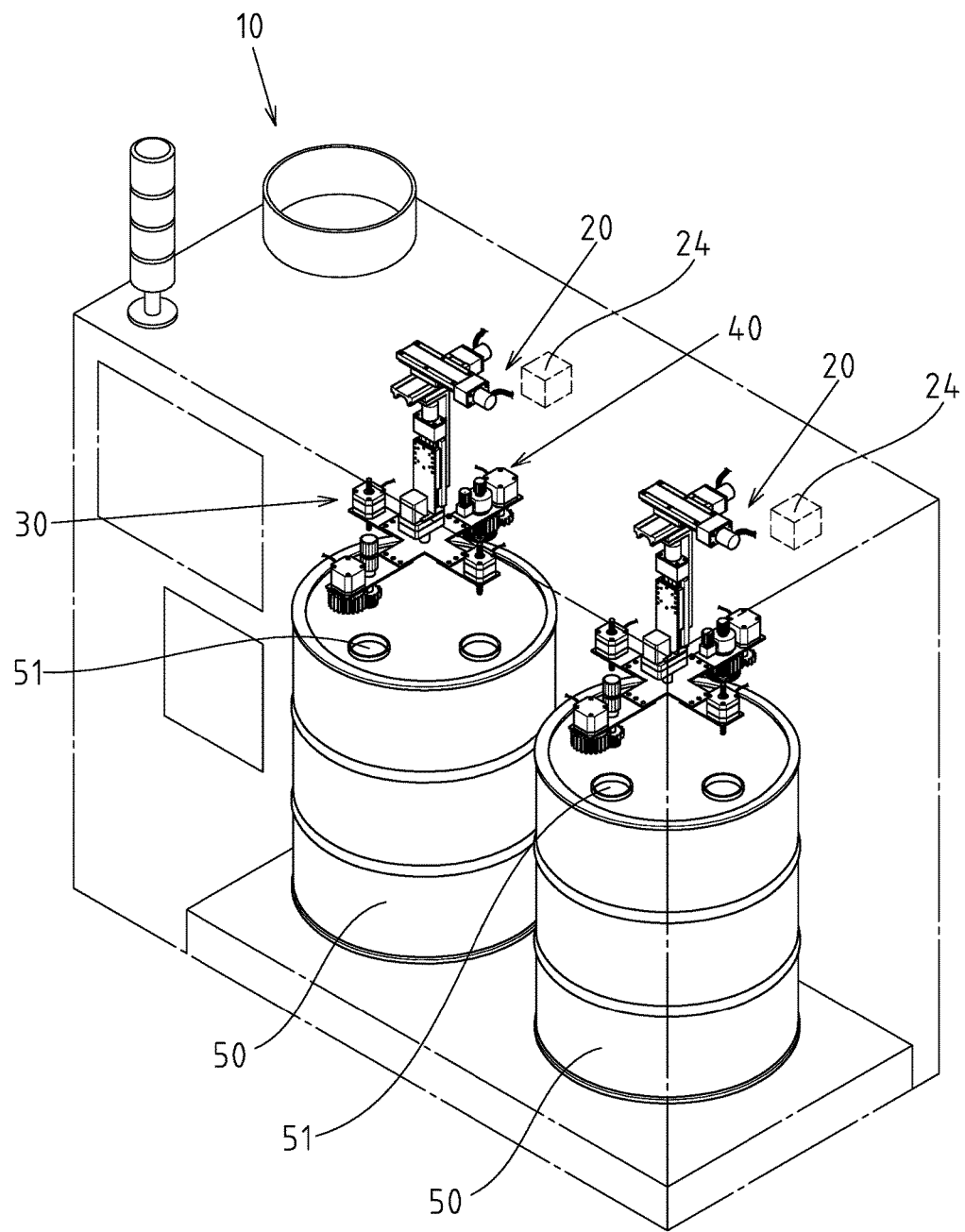
FIG. 1 is a stereogram of the assembly of the better embodiment of the present invention.

Referring to FIGS. 1, 2, 3 and 4, which show the preferred embodiment of the present invention of automatic cover-opening and connector-replacing device for chemical container. This embodiment is for illustrative purposes only and the patent application is not restricted by this structure. Said automatic cover-opening and connector-replacing device for chemical container comprises a machine 10, a lifting device 20 provided inside the machine 10, a cover-opening device 30 connected with the lifting device 20 and a liquid-pumping device 40 connected with the lifting device 20. The cover-opening device 30 is provided for assembling and disassembling the internal cover 51 of a chemical container 50, the liquid-pumping device 40 is socketed on the opening 52 of the chemical container 50 and the liquid-pumping device 40 is provided for pumping the content of the chemical container 50 where the lifting device 20 is provided for adjusting the distance between the cover-opening device 30, liquid-pumping device 40 and chemical container 50. Moreover, the lifting device 20 has a rotary motor 21 and a fixing bracket 22. The rotary motor 21 is connected to the fixing bracket 22 and the rotary motor 21 actuates the fixing bracket 22 to rotate correspondingly so as to form a gyration space P. The fixing bracket 22 has a first connection arm 221 and a second connection arm 222. The cover-opening device 30 and the liquid-pumping device 40 is provided on the first connection arm 221 and second connection arm 222 respectively. An axis 223 is formed by the fixing bracket 22 at the junction of the first connection arm 221 and second connection arm 222. The rotary motor 21 is fixed onto the axis 223 and connected with the fixing bracket 22 through an axle 211. In this example, the fixing bracket 22 even comprises a third connection arm 224 and a fourth connection arm 225. The axis 223 of the fixing bracket 22 is formed at the junction of the first, second, third and fourth connection arms of 221, 222, 224 and 225, and the first connection arm 221 and fourth connection arm 225 are located on a same straight line and connected with each other and the second connection arm 222 and third connection arm 224 are located on a same straight line and connected with each other so that the fixing bracket 22 is in a cross-shaped structure.

The cover-opening device 30 comprises a first screw motor 31 as well as a first screw 32 and a first cover-opening fixture 33 provided within the first screw motor 31 correspondingly where the first screw motor 31 is provided on the first connection arm 221, the first screw 32 is driven by the first screw motor 31, the first screw 32 can rotate through the first connection arm 221, the first cover-opening fixture 33 is provided at the bottom of the first screw 32 correspondingly, the first screw motor 31 actuates the first screw 32 to rotate correspondingly, the first screw 32 further drives the first cover-opening fixture 33 to move up and down and the first cover-opening fixture 33 is used to uninstall the internal cover 51 of the chemical container 50. The liquid-pumping device 40 comprises a first transmission assembly 41 and a liquid-pumping connector 42 where the first transmission assembly 41 is provided on the second connection arm 222, the liquid-pumping connector 42 is connected to the first transmission assembly 41 and the first transmission assembly 41 actuates the liquid-pumping connector 42 to move up and down correspondingly. In addition, the lifting device 20 even comprises a triaxial sliding table 23 where the rotary motor 21 and triaxial sliding table 23 are connected with each other; and the triaxial sliding table 23 comprises a first horizontal movement device 231, a second horizontal movement device 232 and a vertical movement device 233 used to adjust the corresponding positions of the fixing bracket 22 and chemical container 50. Moreover, said automatic cover-opening and connector-replacing device for chemical container even comprises an image capture device 24 to perform image capturing on the chemical container 50 to obtain the image data of the chemical container 50. The image capture device 24 is coupled to the lifting device 20 where a control signal is generated according to the image data and sent to the lifting device 20 so that the lifting device 20 could adjust the positions of the cover-opening device 30 and liquid-pumping device 40. In this example, the position of the fixing bracket 22 is adjusted in all directions according to the horizontal and vertical distance from the fixing bracket 22 to the chemical container 50 in the image data so as to fulfill the fixing bracket 22 positioning operation in a fast and accurate manner.

The first transmission assembly 41 comprises a first gear motor 411, a first driving gear 412 connected with the first gear motor 411, a first driven gear 413, a first spindle 414 connected with the liquid-pumping connector 42 and a liquid-pumping pipe 415 connected to the liquid-pumping connector 42 where the first driven gear 413 is connected with the liquid-pumping connector 42, the first gear motor 411 and the first spindle 414 are provided in parallel on the second connection arm 222, the first driving gear 412 can rotate on the second connection arm 222, the first driving gear 412 is driven by the first gear motor 411, the first driven gear 413 is socketed on the outer peripheral surface of the first spindle 414, the first driven gear 413 is engaged with the first driving gear 412 so that the first driven gear 413 could rotate by taking the first spindle 414 as the axis and the first spindle 414 further drives the liquid-pumping connector 42 to move up and down.

The cover-opening device 30 comprises a second screw motor 34 as well as a second screw 35 and a second cover-opening fixture 36 provided correspondingly within the second screw motor 34 where the second screw motor 34 is provided on the fourth connection arm 225, the second screw 35 is driven by the second screw motor 34, the second screw 35 can rotate through the fourth connection arm 225, the second cover-opening fixture 36 is provided at the bottom of the second screw 35 correspondingly, the second screw motor 34 actuates the second screw 35 to rotate correspondingly, the second screw 35 further drives the second cover-opening fixture 36 to move up and down and the second cover-opening fixture 36 is used to uninstall the internal cover 51 of the chemical container 50. The liquid-pumping device 40 even comprises a second transmission assembly 43 and an air-exchange-and-return connector 44 where the second transmission assembly 43 is provided on the third connection arm 224, the air-exchange-and-return connector 44 is connected to the second transmission assembly 43 and the second transmission assembly 43 actuates the air-exchange-and-return connector 44 to move up and down correspondingly.

The second transmission assembly 43 comprises a second gear motor 431, a second driving gear 432 connected with the second gear motor 431, a second driven gear 433, a second spindle 434 connected with the air-exchange-and-return connector 44 and an air-exchange pipe 436 connected to the air-exchange-and-return connector 44 where the second gear motor 431 and the second spindle 434 are provided in parallel on the third connection arm 224, the second driving gear 432 is driven by the second gear motor 431, the second driven gear 433 is socketed on the outer peripheral surface of the second spindle 434, the second driven gear 433 is engaged with the second driving gear 432, the second spindle 434 is provided to go through the center of the second driven gear 433 so that the second driven gear 433 could rotate by taking the second spindle 434 as the axis and the second spindle 434 further drives the air-exchange-and-return connector 44 to move up and down. Among which, the liquid-pumping device 40 even comprises a return pipe 435 connected to the air-exchange-and-return connector 44.

Figure 2:
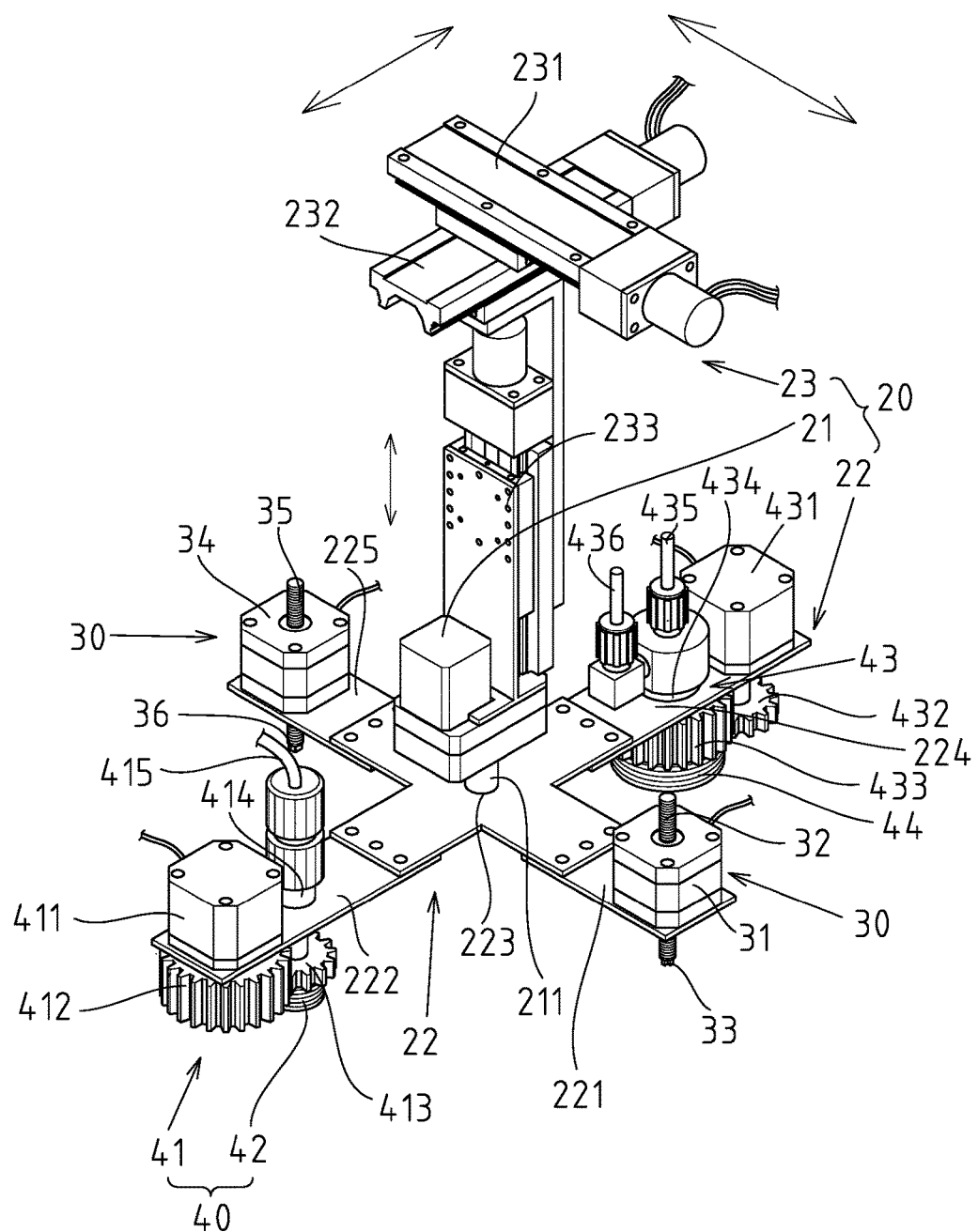
FIG. 2 is a stereogram of the assembly of the lifting device, cover-opening device and liquid-pumping device continued from FIG. 1.
Figure 3:
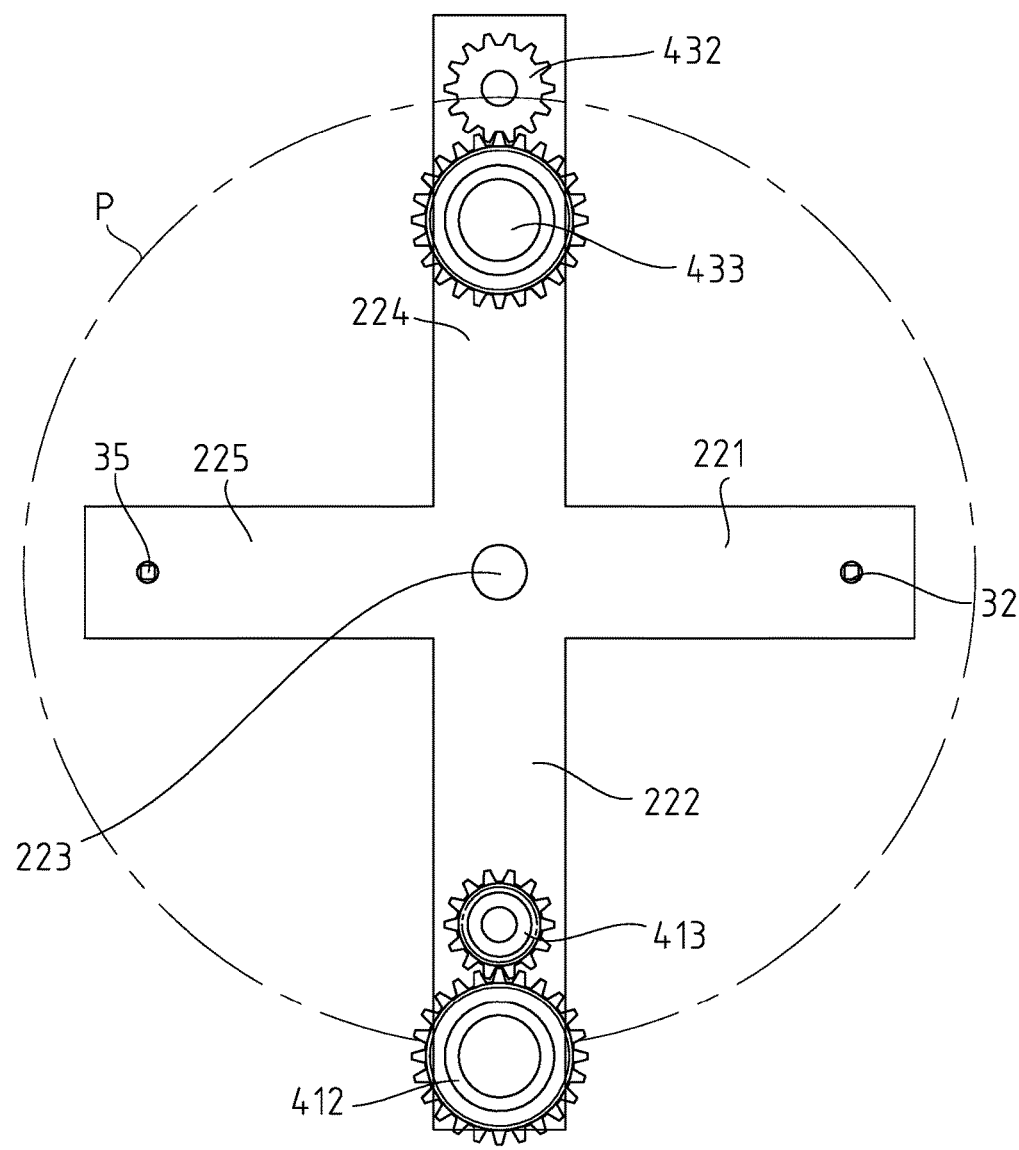
FIG. 3 is a bottom view continued from FIG. 2.
Figure 5:
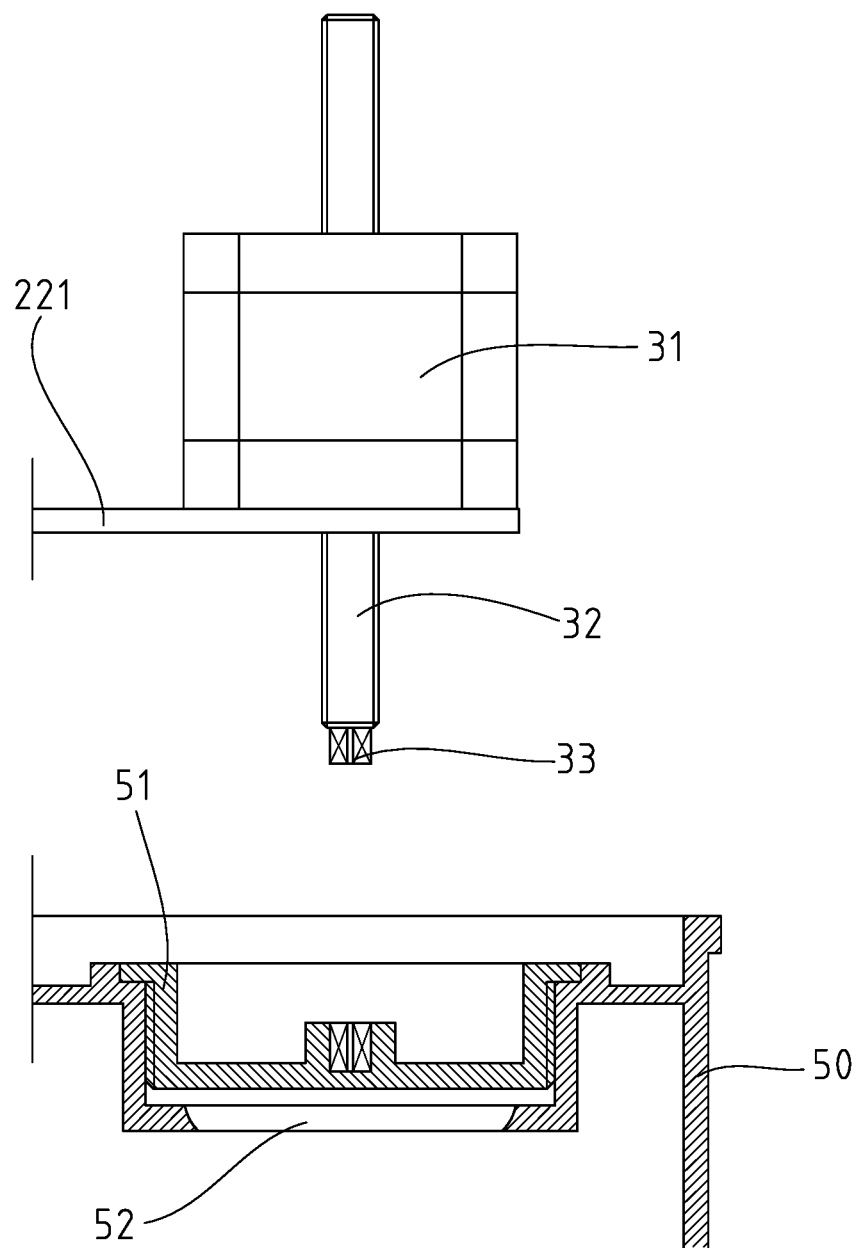
FIG. 5 is an actuation diagram I between the cover-opening device and chemical container continued from FIG. 1.
Figure 6:
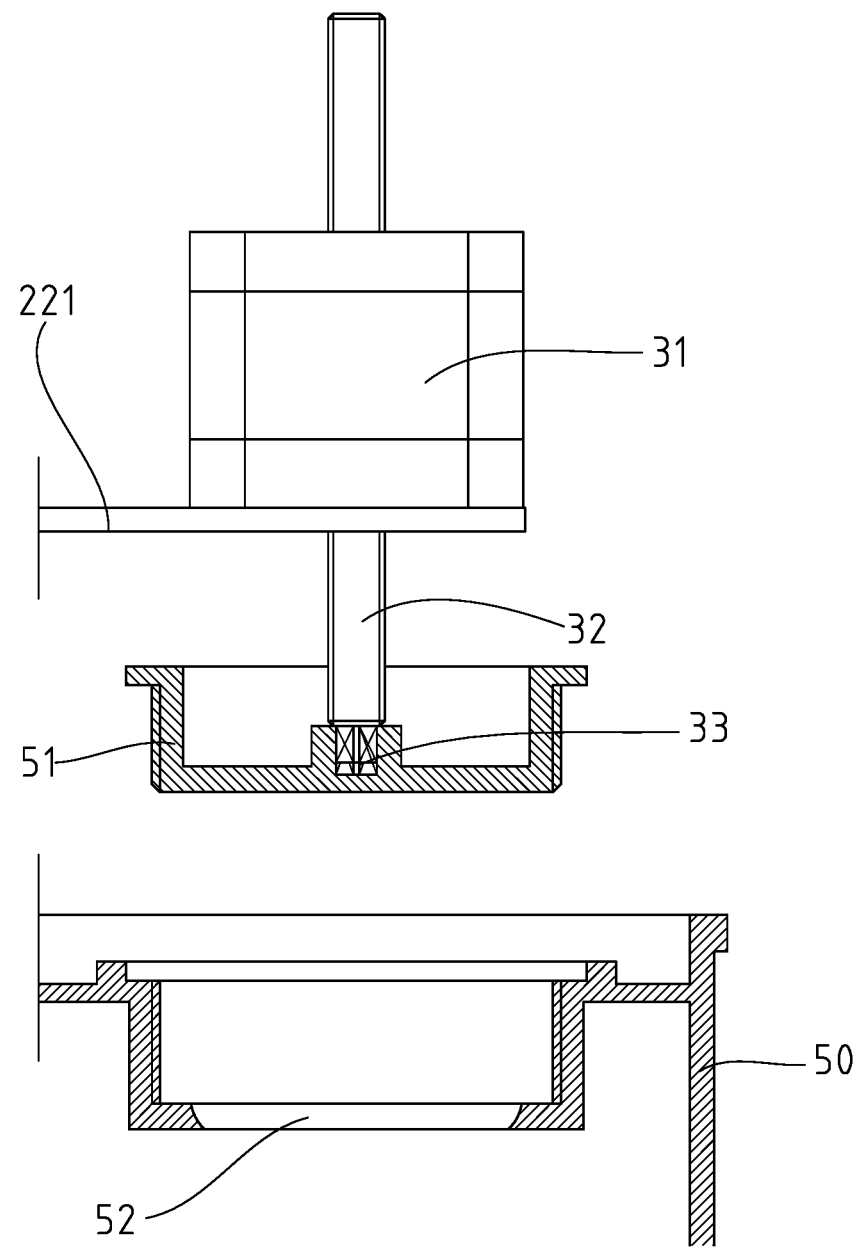
FIG. 6 is an actuation diagram II continued from FIG. 5.

With said structure and composition design, the usage and action status of the present invention is explained as follows: the automatic cover-opening operation function of the cover-opening device 30 referred in the present invention is realized by operating the lifting device 20. As shown in FIGS. 2, 3 and 5, first, the lifting device 20 finely adjust and correct the distance error between the chemical container 50 and fixing bracket 22 through the position image data of chemical container 50 measured by the image capture device 24, namely, the fixing bracket 22 moving to above the chemical container 50 by utilizing the first horizontal movement device 231 and second horizontal movement device 232 of the triaxial sliding table 23 to position the first cover-opening fixture 33 at a cover-opening operation position corresponding to the internal cover 51 of the chemical container 50, and the fixing bracket 22 also moves downwards at the same time driven by the vertical movement device 233 so as to adjust the preset height between the fixing bracket 22 and chemical container 50. Next, as shown in FIG. 6, the first screw motor 31 drives the first screw 32 to rotate where the first screw 32 drives the first cover-opening fixture 33 to move downwards causing the first cover-opening fixture 33 to move and bolted onto the internal cover 51 of the chemical container 50, and then the first screw motor 31 drives the first screw 32 to rotate reversely where the first screw 32 drives the first cover-opening fixture 33 to move upwards causing the internal cover 51 to leave the chemical container 50 with the first cover-opening fixture 33 to achieve the automatic cover-opening operation. In this example, the actuation mode of the second cover-opening fixture 36 is same with that of the first cover-opening fixture 33 and the details will not be repeated here. In addition, because the first and second cover-opening fixtures of 33 and 36 are provided on a same straight line, the first and second cover-opening fixtures of 33 and 36 can be actuated synchronously through the lifting device 20 and other linkage components; and, the first and second cover-opening fixtures of 33 and 36 further removes the internal covers 51 provided corresponding to the two openings 52 of the chemical container 50 respectively.

Figure 4:
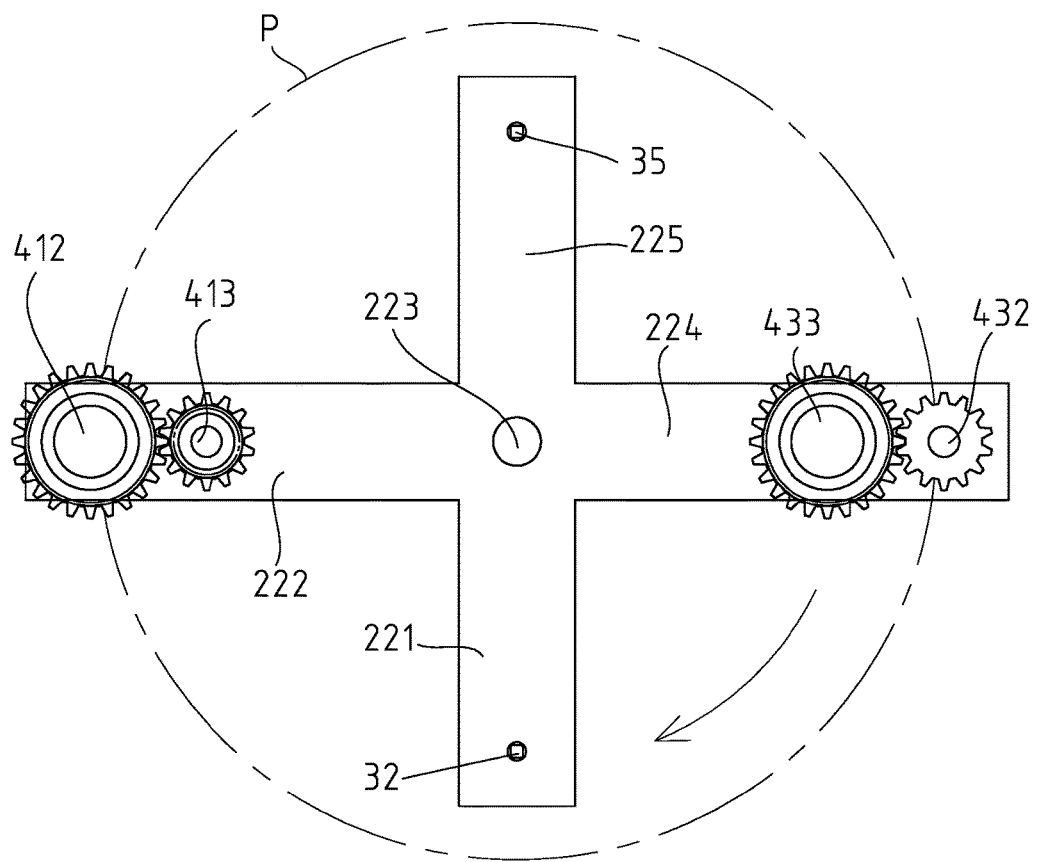
FIG. 4 is an actuation diagram continued from FIG. 3.
Figure 7:
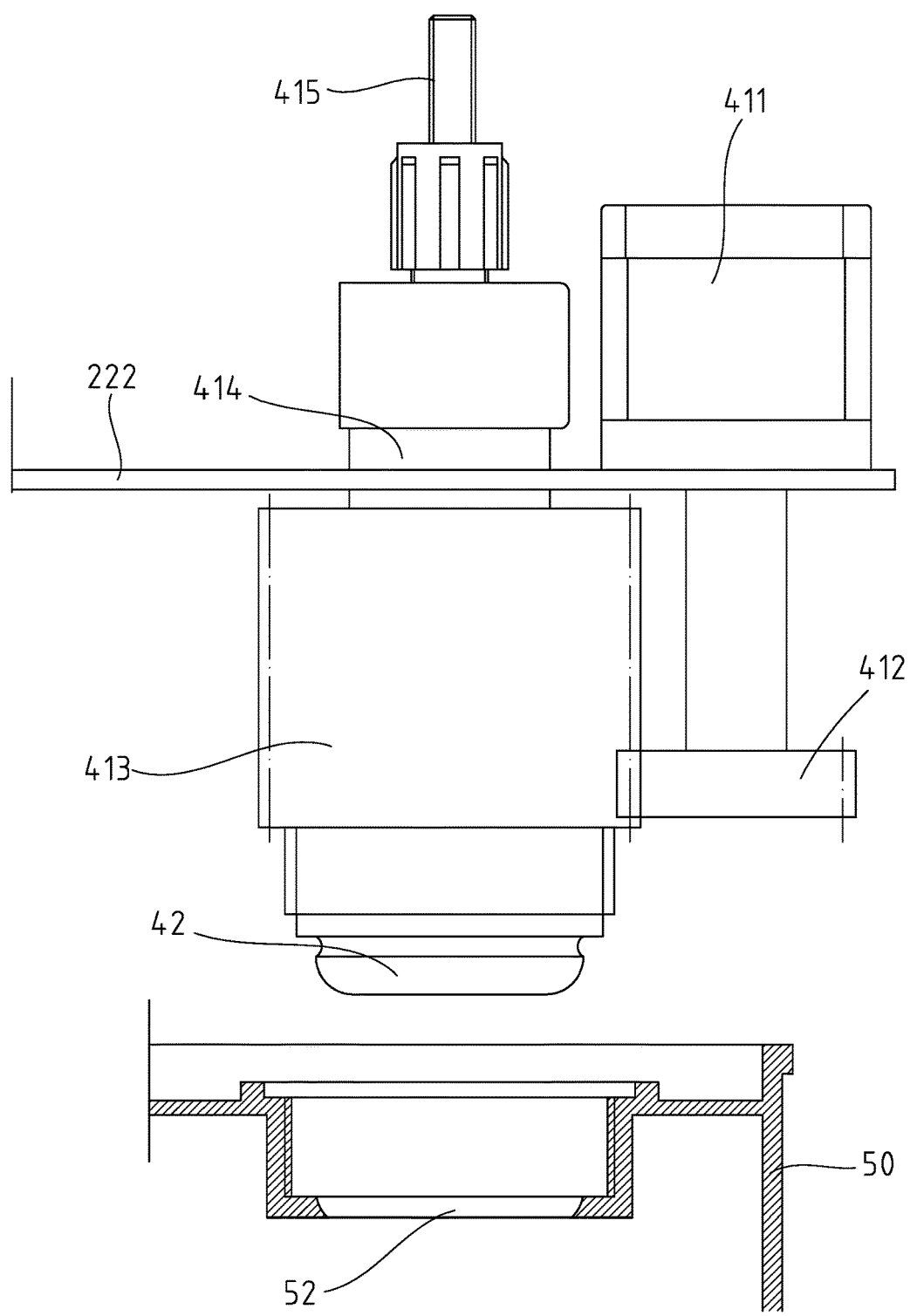
FIG. 7 is an actuation diagram III between the liquid-pumping device and chemical container continued from FIG. 1.
Figure 8:
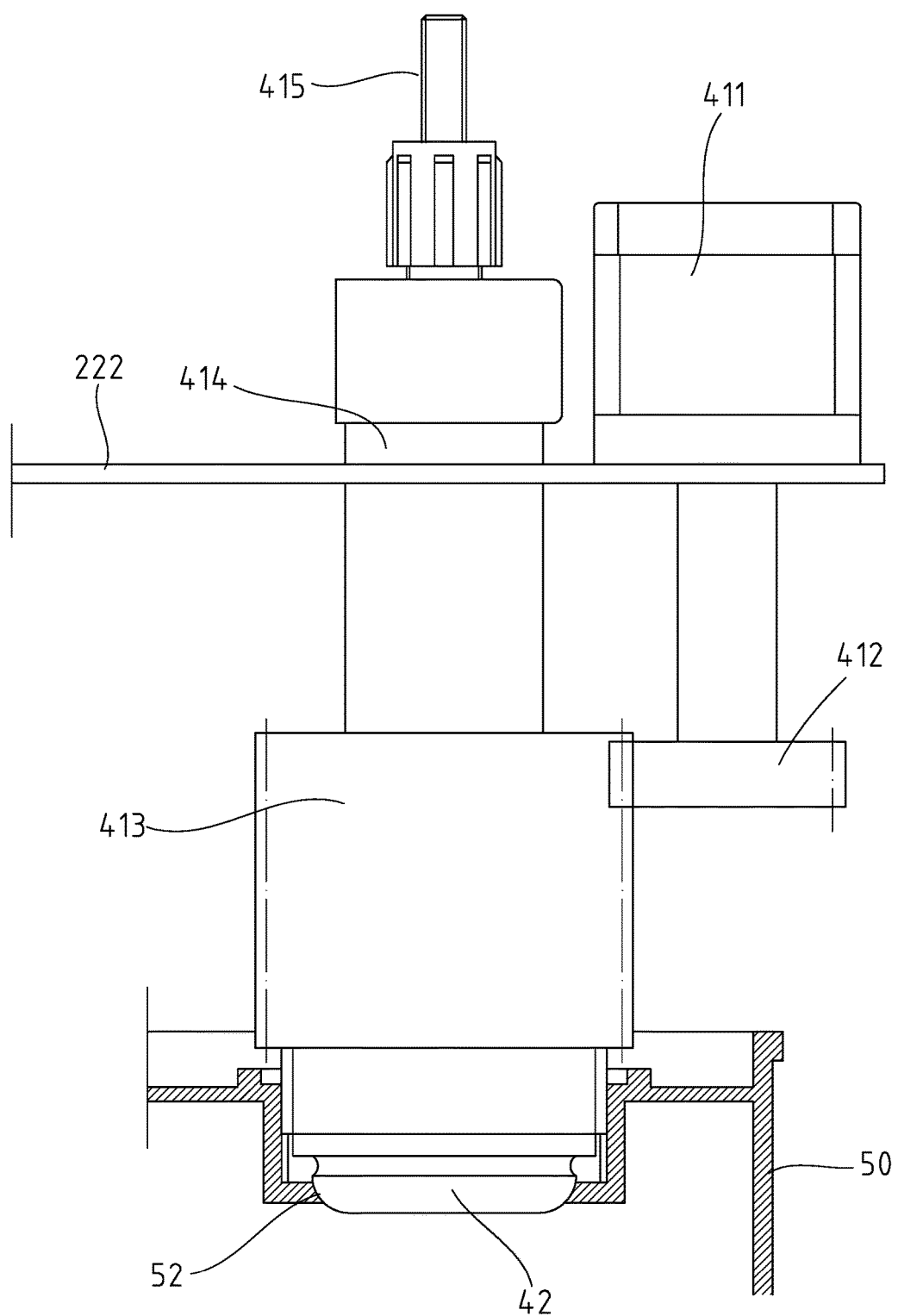
FIG. 8 is an actuation diagram IV continued from FIG. 7.

Moreover, the automatic alignment and connector-changing operation function of the liquid-pumping device 40 referred in the present invention is realized by operating the lifting device 20. First, as shown in FIGS. 4 and 7, the rotary motor 21 drives the fixing bracket 22 to rotate a certain predetermined degree to cause the liquid-pumping device 40 to move to the operation position, namely, the liquid-pumping connector 42 being at a liquid-pumping operation position corresponding to the internal cover 51 of the chemical container 50. Next, as shown in FIG. 8, the first gear motor 411 drives the first driving gear 412 to rotate so that the first driving gear 412 drives the first driven gear 413 to rotate and the first spindle 414 to move accordingly through the first driven gear 413. Thus, the first spindle 414 drives the liquid-pumping connector 42 to move downwards and cause the liquid-pumping connector 42 to be socketed and locked onto the opening 52 of the chemical container 50 to achieve the relevant automatic connector jointing and positioning operation. In this example, the actuation mode of the air-exchange-and-return connector 44 is same with that of the liquid-pumping connector 42 and the details will not be repeated here. In addition, because the air-exchange-and-return connector 44 and liquid-pumping connector 42 are provided on a same straight line, the air-exchange-and-return connector 44 and liquid-pumping connector 42 can be actuated synchronously through the lifting device 20 and other linkage components, and the air-exchange-and-return connector 44 and liquid-pumping connector 42 will be further connected correspondingly onto the two openings 52 of the chemical container 50 respectively. Finally, when the liquid pumping ends, the first and second transmission assemblies of 41 and 43 drive the liquid-pumping connector 42 and air-exchange-and-return connector 44 to move reversely and leave the opening 52 of the chemical container 50 respectively. Then the fixing bracket 22 moves upwards driven by the triaxial sliding table 23 and then rotates reversely a certain degree driven by the rotary motor 21 to position the cover-opening device 30 at the operation position; and in the end, the first and second screw motors of 31 and 34 drive the components to move reversely to cause the internal cover 51 to be locked back onto the opening 52 of the chemical container 50, thus completing the automatic cover opening and changing as well as the liquid-pumping operation process.

Figure 9:
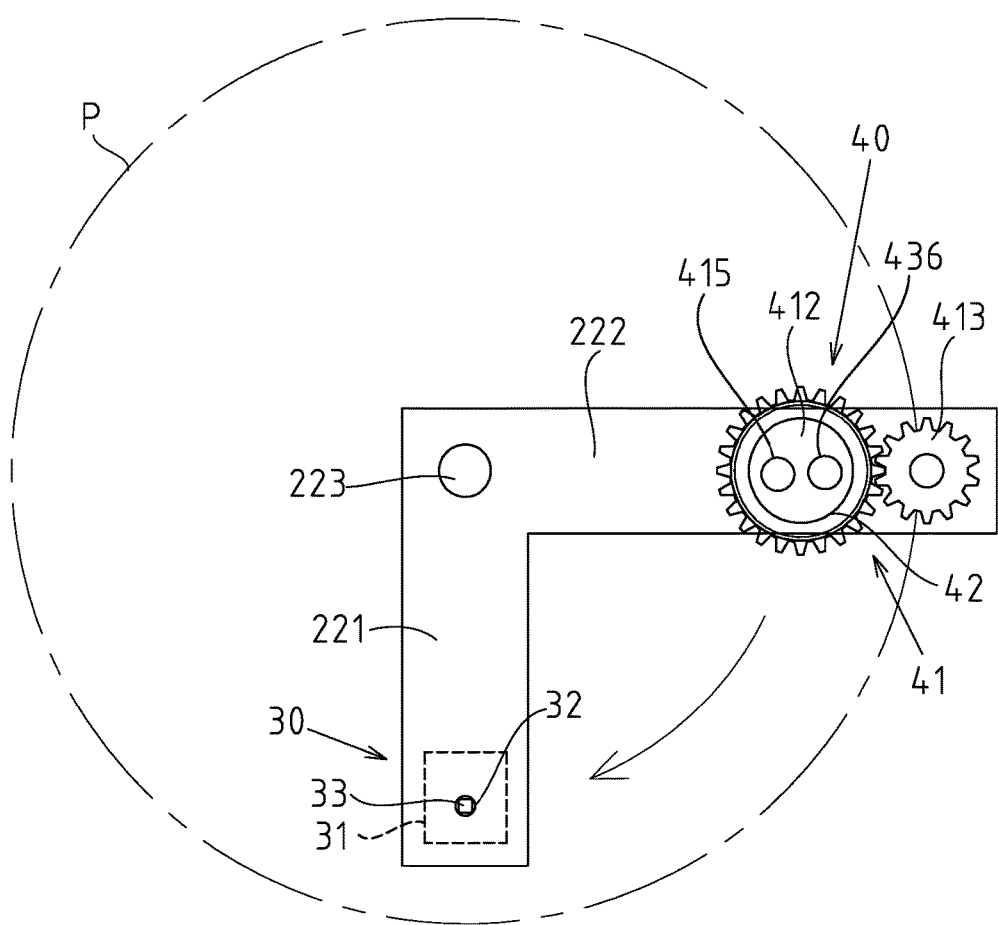
FIG. 9 is a schematic diagram of another embodiment of the present invention, which indicates that the fixing bracket is an L-shaped structure.

As shown in FIG. 9, it is another embodiment of the present invention. The main differences of it with the best embodiment lie in that the fixing bracket 22 only has the first connection arm 221 and second connection arm 222, the fixing bracket 22 is in a L-shaped structure design and the cover-opening device 30 and liquid-pumping device 40 is provided on the first connection arm 221 and second connection arm 222 of the fixing bracket 22 respectively where the cover-opening device 30 only comprises the first screw motor 31, first screw 32 and first cover-opening fixture 33, and the liquid-pumping device 40 only comprises the first transmission assembly 41 and liquid-pumping connector 42. Moreover, the liquid-pumping connector 42 can be connected with the liquid-pumping pipe 415 and air-exchange pipe 436 at the same time where the air-exchange pipe 436 can be used to balance the internal pressure of the chemical container 50 with the external environment to achieve the effect of continuous liquid pumping. In addition, the chemical container 50 can be only provided with a single opening 52 (the indication is omitted in the drawing.) and the automatic cover opening and changing as well as the liquid-pumping operation can be conducted through the cover-opening device 30 and liquid-pumping device 40 provided on the first connection arm 221 and second connection arm 222 respectively.

Figure 10:
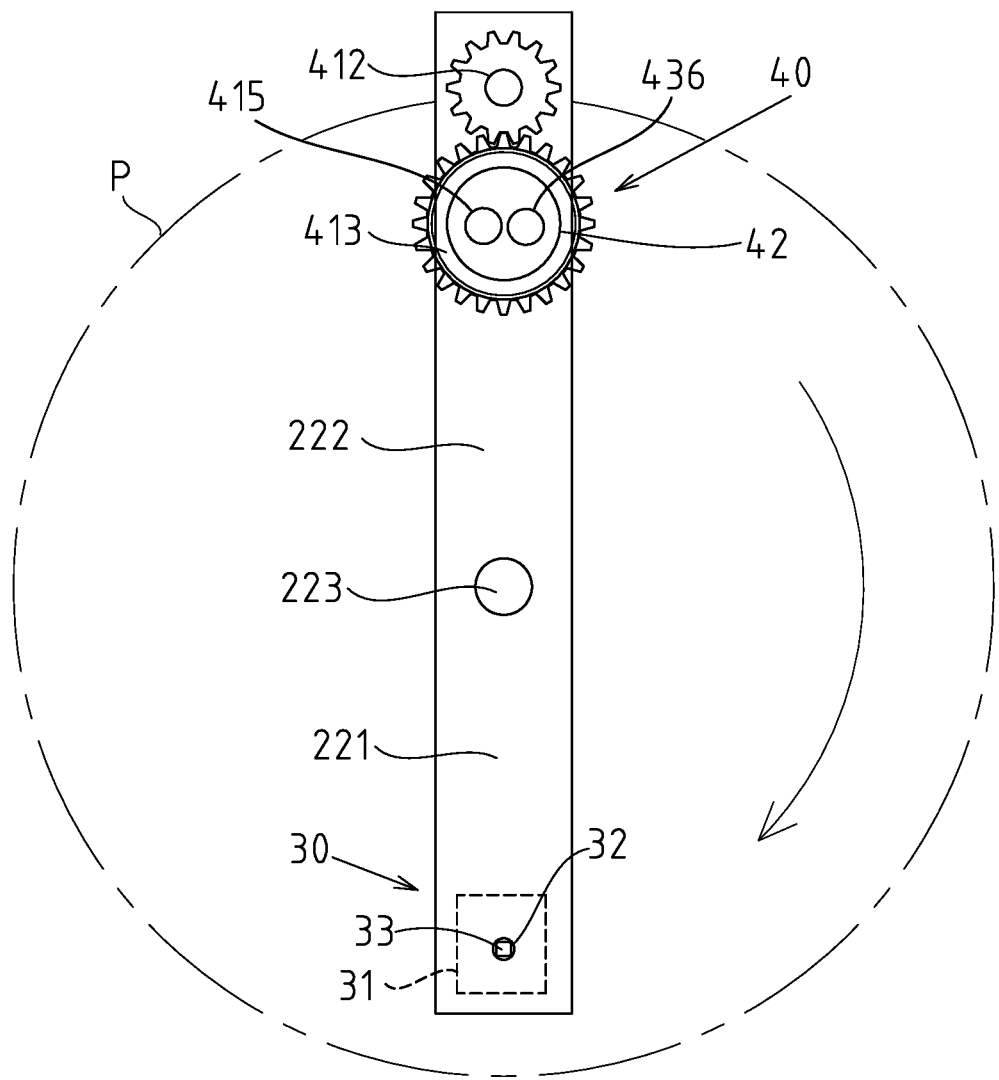
FIG. 10 is a schematic diagram of another embodiment of the present invention, which indicates that the fixing bracket is a straight-shaped structure.

In other embodiments, as shown in FIG. 10, the fixing bracket 22 can also be in the straight-shaped structure design. Similarly, the cover-opening device 30 and liquid-pumping device 40 is provided on the first connection arm 221 and second connection arm 222 of the fixing bracket 22 respectively and the liquid-pumping pipe 415 and air-exchange pipe 436 are connected with the liquid-pumping connector 42 in the same way, which can also achieve the continuous liquid pumping effect. Moreover, the chemical container 50 is also only provided with a single opening 52 (the indication is omitted in the drawing) and the automatic cover opening and changing as well as the liquid-pumping operation can be conducted through the cover-opening device 30 and liquid-pumping device 40 provided on the first connection arm 221 and second connection arm 222 respectively.

We claim:

1. An automatic cover-opening and connector-replacing device for a chemical container, which comprises:
   a machine;
   a lifting device provided inside the machine;
   a cover-opening device connected with the lifting device where the cover-opening device is provided for assembling and disassembling the internal cover of a chemical container; and
   a liquid-pumping device connected with the lifting device where the liquid-pumping device is provided for pumping the content of the chemical container;
   wherein the lifting device is provided for adjusting the distance between the cover-opening device, liquid-pumping device and chemical container; the lifting device has a rotary motor and a fixing bracket; the rotary motor is connected to the fixing bracket and the rotary motor actuates the fixing bracket to rotate correspondingly; the fixing bracket has a first connection arm and a second connection arm; and the cover-opening device and the liquid-pumping device are provided on the first connection arm and second connection arm respectively,
   an axis is formed by the fixing bracket at a junction of the first connection arm and second connection arm; and the rotary motor is fixed onto the axis and connected with the fixing bracket through an axle.

2. The device defined in claim 1, wherein the cover-opening device comprises a first screw motor as well as a first screw and a first cover-opening fixture provided within the first screw motor correspondingly where the first screw motor is provided on the first connection arm, the first screw is driven by the first screw motor, the first screw can rotate through the first connection arm, the first cover-opening fixture is provided at a bottom of the first screw correspondingly, the first screw motor actuates the first screw to rotate correspondingly and the first screw further drives the first cover-opening fixture to move up and down; the liquid-pumping device comprises a first transmission assembly and a liquid-pumping connector where the first transmission assembly is provided on the second connection arm, the liquid-pumping connector is connected to the first transmission assembly and the first transmission assembly actuates the liquid-pumping connector to move up and down correspondingly.

3. The device defined in claim 2, wherein the first transmission assembly comprises a first gear motor, a first driving gear connected with the first gear motor, a first driven gear, a first spindle connected with the liquid-pumping connector and a liquid-pumping pipe connected to the liquid-pumping connector where the first driven gear is connected with the liquid-pumping connector, the first gear motor and the first spindle are arranged in parallel on the second connection arm, the first driving gear can rotate on the second connection arm, the first driving gear is driven by the first gear motor, the first driven gear is socketed on an outer peripheral surface of the first spindle, the first driven gear is engaged with the first driving gear so that the first driven gear can rotate by taking the first spindle as the axis and the first spindle further drives the liquid-pumping connector to move up and down.

4. The device defined in claim 3, wherein the fixing bracket is either in a L shape or straight shape.

5. The device defined in claim 3, wherein the fixing bracket comprises a third connection arm and a fourth connection arm; the axis of the fixing bracket is formed at a junction of the first, second, third and fourth connection arms; and the first connection arm and fourth connection arm are located on a same straight line and connected with each other and the second connection arm and third connection arm are located on a same straight line and connected with each other so that the fixing bracket is in a cross-shaped structure; the cover-opening device comprises a second screw motor as well as a second screw and a second cover-opening fixture provided correspondingly within the second screw motor where the second screw motor is provided on the fourth connection arm, the second screw is driven by the second screw motor, the second screw can rotate through the fourth connection arm, the second cover-opening fixture is provided at a bottom of the second screw correspondingly, the second screw motor actuates the second screw to rotate correspondingly and the second screw further drives the second cover-opening fixture to move up and down; the liquid-pumping device comprises a second transmission assembly and an air-exchange-and-return connector where the second transmission assembly is provided on the third connection arm, the air-exchange-and-return connector is connected to the second transmission assembly and the second transmission assembly actuates the air-exchange-and-return connector to move up and down correspondingly.

6. The device defined in claim 5, wherein the second transmission assembly comprises a second gear motor, a second driving gear connected with the second gear motor, a second driven gear, a second spindle connected with the air-exchange-and-return connector and an air-exchange pipe connected to the air-exchange-and-return connector where the second gear motor and second spindle are arranged in parallel on the third connection arm, the second driving gear is driven by the second gear motor, the second driven gear is socketed on an outer peripheral surface of the second spindle, the second driven gear is engaged with the second driving gear, the second spindle is arranged to go through the center of the second driven gear so that the second driven gear could rotate by taking the second spindle as the axis and the second spindle further drives the air-exchange-and-return connector to move up and down.

7. The device defined in claim 6, wherein the liquid-pumping device comprises a return pipe connected to the air-exchange-and-return connector.

8. The device defined in claim 7, wherein the lifting device comprises a triaxial sliding table and the rotary motor and the triaxial sliding table are connected with each other.

9. The device defined in claim 8, further comprising an image capture device; the image capture device is coupled to the lifting device where a control signal is generated according to image data and sent to the lifting device so that the lifting device can adjust the positions of the cover-opening device and liquid-pumping device.

10. The device defined in claim 2, wherein the fixing bracket comprises a third connection arm and a fourth connection arm; the axis of the fixing bracket is formed at a junction of the first, second, third and fourth connection arms; and the first connection arm and fourth connection arm are located on a same straight line and connected with each other and the second connection arm and third connection arm are located on a same straight line and connected with each other so that the fixing bracket is in a cross-shaped structure; the cover-opening device comprises a second screw motor as well as a second screw and a second cover-opening fixture provided correspondingly within the second screw motor where the second screw motor is provided on the fourth connection arm, the second screw is driven by the second screw motor, the second screw can rotate through the fourth connection arm, the second cover-opening fixture is provided at a bottom of the second screw correspondingly, the second screw motor actuates the second screw to rotate correspondingly and the second screw further drives the second cover-opening fixture to move up and down; the liquid-pumping device comprises a second transmission assembly and an air-exchange-and-return connector where the second transmission assembly is provided on the third connection arm, the air-exchange-and-return connector is connected to the second transmission assembly and the second transmission assembly actuates the air-exchange-and-return connector to move up and down correspondingly.

11. The device defined in claim 10, wherein the second transmission assembly comprises a second gear motor, a second driving gear connected with the second gear motor, a second driven gear, a second spindle connected with the air-exchange-and-return connector and an air-exchange pipe connected to the air-exchange-and-return connector where the second gear motor and second spindle are arranged in parallel on the third connection arm, the second driving gear is driven by the second gear motor, the second driven gear is socketed on an outer peripheral surface of the second spindle, the second driven gear is engaged with the second driving gear, the second spindle is arranged to go through the center of the second driven gear so that the second driven gear could rotate by taking the second spindle as the axis and the second spindle further drives the air-exchange-and-return connector to move up and down.

12. The device defined in claim 11, wherein the liquid-pumping device comprises a return pipe connected to the air-exchange-and-return connector.

13. The device defined in claim 12, wherein the lifting device comprises a triaxial sliding table and the rotary motor and the triaxial sliding table are connected with each other.

14. The defined in claim 13, further comprising an image capture device; the image capture device is coupled to the lifting device where a control signal is generated according to image data and sent to the lifting device so that the lifting device can adjust the positions of the cover-opening device and liquid-pumping device.

\* \* \* \* \*